Patented July 2, 1946

2,403,251

UNITED STATES PATENT OFFICE 2,403,251

PRODUCTION OF FIBERS FROM PROTEINS

Frederick K. Watson, Wilmington, Del., assignor to E. I. du Pont de Nemours & Company, Wilmington, Del., a corporation of Delaware No Drawing. Application August 4, 1942, Serial No. 453,606

1 Claim. (Cl. 106—146)

This invention relates to the production of fibers from proteins and more particularly to the production of fibers from water-soluble, globular proteins.

In converting proteins into fibers it has been the usual practice to form a dispersion of the protein and to extrude this dispersion into a suitable coagulating medium. However, in ordinary practice numerous difficulties have been encountered in these initial steps of obtaining protein fibers. The first difficulty normally encountered is unevenness in the gross dispersion of the protein in the solvent. This difficulty results because of the well known tendency of common water-insoluble proteins to swell, to gelatinize and to agglomerate when first treated with a solvent.

Heretofore the protein has been dispersed in water by the use of alkaline substances, such as sodium hydroxide, trisodium phosphate and sodium carbonate. While these agents are very effective for this purpose, the resulting solutions are highly alkaline, corrosive and solutions with relatively high protein content are unstable viscometrically even for short periods of time. These factors tend to put limitations on both the equipment and schedules suitable for the manufacture of protein fibers. Another difficulty experienced in the use of these common solubilizing agents is caused by the wide variations in solution viscosity associated with minute changes in the alkali content of the composition.

This invention has as an object the conversion of proteins into fibers. It is a further object of this invention to accomplish the conversion of proteins into fibers under conditions favorable to the preservation of the protein structure. Another object is to provide a process of manufacture for protein fibers characterized by greater simplicity, wider operating limits and less stringent conditions than those now in use. A still further object is the production of protein fibers which are particularly susceptible to stretching. Other objects will appear hereinafter.

These objects are accomplished by a process comprising the dissolving of a water-insoluble, globular protein directly in an aqueous solution containing a long-chain anionic surface-active agent as essentially the only solubilizing agent for the protein in the solution, extrusion of this solution in fiber form into a coagulating bath, stretching the protein fibers and treatment of the resulting fibers with a protein hardening agent. This protein hardening agent is preferably an aqueous solution of formaldehyde and inorganic salts. It is desirable that the protein solution contain at least 6% by weight of protein and that the anionic surface-active agent be present in amount to the extent of at least 15% by weight of the protein. The protein fibers of this invention may be stretched either in the coagulating bath or as an after treatment.

A preferred form of this invention is carried out by stirring the protein into a solution of the anionic surface-active agent in the calculated volume of water since this procedure yields uniform solutions of the finely divided protein and prevents the agglomeration difficulties associated with the usual alkali solubilization procedures. However, it has been found possible to add the protein to a predetermined amount of water and then add the surface-active agent in order to prepare the spinning solution. Finely divided protein is generally used in order to facilitate solution.

Although protein solutions result in most cases merely on allowing the compositions to stand, more rapid and uniform solution results if the compositions are stirred or tumbled during the period required for solution. This period is generally slightly longer than that necessary for alkali solubilization and is characterized by a gradual rise in the viscosity of the solution. The production of excessive foam during solution of the surface-active agents makes addition of the protein difficult and may be avoided by moderation of the agitation during solution of the agent. An anti-foaming agent also may be added.

The protein fibers of this invention can most conveniently be obtained by a wet spinning process. Before spinning, the protein solution can be filtered and deaerated to avoid stoppages in the spinneret. The usual gear pump, candle filter and viscose-type spinneret have been found satisfactory for use in the process of this invention. The number of orifices in the spinneret has little effect except on the rate of fiber production so that spinnerets containing either one or several thousand orifices can be employed. The protein solutions of the present invention are much less alkaline and corrosive than the conventional alkali-solubilized spinning solutions thereby permitting greater latitude in the materials of construction of the spinning apparatus.

From the spinneret the protein solution is extruded directly into a coagulating bath containing chemicals which facilitate the transformation of the extruded protein solution to a solid protein fiber. A suitable bath is one having a density greater than 1.2 and containing both inorganic salts, such as sodium sulfate or sodium chloride, and a strong mineral acid. The coagulated protein fiber is then stretched and hardened in a suitable chemical solution. Such a hardening solution is one containing 2% formaldehyde and 25% sodium chloride or similar inorganic salts. The resulting fiber is rinsed and dried. Alternatively partial hardening may be carried out prior to the stretching step. The protein fibers of this invention can be used in either the filament or staple form.

Among the proteins useful in this invention are the water-insoluble globular proteins of the class consisting of globulins, prolamines and phosphoproteins. The globulins most suitable for the process of this invention are those derived from soybeans, cotton seeds and peanuts. Zein is the best known and most suitable protein of the class of prolamines. Casein is the preferred phosphoprotein because of its ready availability, standardized preparation and susceptibility to the action of the surface-active agents of this invention.

The long-chain anionic surface-active agents which are effective in this invention contain at least 8 carbon atoms in the organic radical of which at least 3 carbon atoms are in an aliphatic chain. By long-chain anionic surface-active agent is meant a water-soluble ionizable organic salt, the negative ion of which contains a polar solubilizing group linked to a non-polar residue containing at least 8 carbon atoms of which at least 3 carbon atoms are in an aliphatic chain. The number of carbon atoms in the organic radical has been found to have a considerable effect in determining the efficiency of the compound as a protein solubilizing agent. Where the organic radical of the anionic surface-active agent contains less than 8 carbon atoms the compound has been found to be practically ineffective. It is preferable to employ surface-active agents containing between 8 carbon atoms and 18 carbon atoms in the organic radical, as more than 18 carbon atoms makes the agent difficult to use because of low solubility.

This invention does not include the non-ionic surface-active agents and the cationic surface-active agents, i. e. those having a positive ion containing a polar solubilizing group linked to a non-polar residue, as surprisingly it has been found that such surface-active agents are ineffective.

The most important classes of the long-chain anionic surface-active agents which have been found useful in this invention are the sulfates, sulfonates and carboxylates.

On the basis of dispersing power for proteins per unit weight, the water-soluble salts of the long-chain alcohol acid sulfates are particularly effective. Among the alkyl sulfate salts which can be utilized are those derivable from octyl, dodecyl, oleyl and hexadecyl alcohols. Small quantities of other materials in these agents, such as the corresponding alcohols or sodium sulfate, while not desirable, do not prevent operation of the process of this invention. The most satisfactory of the water-soluble salts of the long-chain alcohol acid sulfates are the salts of dodecyl sulfuric acid. Where unsaturation is present in the chain, as in a salt of oleyl sulfuric acid, the solubility of the anionic surface-active agent is increased, thereby making it more effective than its saturated derivative. The preferred salts are ammonium salts and those of the common alkali metal class, such as sodium and potassium. Salts of organic bases, such as diethylamine, can also be used.

The salts of long-chain sulfonic acids containing a comparable number of carbon atoms to the heretofore mentioned alkyl sulfate salts can also be used in this invention. These two classes of compounds are particularly suited to the processes of this invention since they are essentially neutralized at or below pH 7. Examples of sulfonates useful in this invention include salts of hexadecyl sulfonic, stearyltaurine, dodecylbenzene sulfonic, diisopropylnaphthalene sulfonic and dioctylsulfosuccinic acids.

Another preferred class of long-chain anionic surface-active agents are the carboxylic acid salts which are readily available at a low cost. Because of their low ionization constants, they require in general the maintenance of a pH greater than 7 in the final solution to insure substantial neutralization of the acid. Some plasticizing action results from the precipitation of fatty acids within the fiber by the acidic coagulating bath. Examples of carboxylic acid salts useful in this invention are sodium oleate, potassium stearate, potassium oleate, and ammonium palmitate.

This invention is further illustrated by the following examples in which the amounts are expressed in parts by weight unless otherwise specified and all percentage quantities of the reagent are based on the normal air-dry weight of the protein.

*Example I*

A protein solution is made by stirring 16 parts of ground sulfuric acid casein in a solution of 8 parts of technical sodium dodecyl sulfate in 76 parts of water at room temperature for 18 hours. The pH of this solution is 5.8. It is filtered at 25 pounds pressure through an assembly of filter cloth and wire screen. Since this solution is viscous, the filtrate is centrifuged to aid in removing the air bubbles. The amount of centrifuging necessary varies with the amount of air introduced during filtration and the viscosity of the solution. For this composition ½ hour at 1500 R. P. M. has been found sufficient. After the surface foam has been removed the deaeration of the solution is completed by subjecting it to reduced pressure of about 0.5 lb./sq. in. absolute for one hour.

This composition is spun in ordinary viscose spinning apparatus. The solution is fed under 20 lbs./sq. in. pressure to a gear pump which forces the material at a regulatable rate through a candle filter and spinneret into the coagulating bath. The bath contains 23% sodium sulfate, 11% sulfuric acid, 4% glucose and 4% aluminum sulfate and is maintained at 22° C. The fibers are wound out of the bath onto bobbins. The wind-up speed is maintained at about 2.66 times the jet velocity to stretch the fibers. When the bobbin is full, it is removed from the wind-up machine and rinsed to remove excess acid in an aqueous solution containing 8% sodium chloride and 4% aluminum sulfate. The bobbins are then immersed for 24 hours in an aqueous hardening solution containing 2% formaldehyde and 25% sodium chloride. The hardened fibers are finally rinsed for one hour in distilled water and then may be finished in any desired manner such as impregnation with a 3% emulsion of a mixture of olive oil and sulfonated olive oil. The resulting fibers are white, silky and lustrous.

Example II

Five parts of a commercial soybean protein preparation is dispersed at room temperature in a solution of 2.5 parts of sodium dodecyl sulfate in 55 parts of water. The dispersion is agitated gently for 16 hours to produce a pale tan translucent solution of high fluidity. The solution is filtered as in Example I and centrifuged to aid in the deaeration of the composition. The solution is spun into an aqueous coagulating bath comprising 20% sodium sulfate, 4% aluminum sulfate, 4% glucose and 6% sulfuric acid. The fine plastic fibers are removed from the coagulating bath, rinsed and hardened in an aqueous bath comprising 7.6% sodium chloride, 3.9% aluminum sulfate and 3.3% formaldehyde. The fibers from this process are white and have a smooth surface and circular cross section.

Example III

A solution containing 12.5 parts of a commercial soybean protein preparation is produced by dissolving the protein in a solution of 12.5 parts of commercial sodium oleate in 131.25 parts of water. This solution is then treated as in Example II and yields very similar fibers.

Example IV

A zein dispersion is prepared by stirring 8 parts of a commercial zein preparation into a solution of 4 parts of technical sodium oleyl sulfate dissolved in 68 parts of water. The dispersion is tumbled for 17 hours to give a fluid solution of pH 7.8. This solution is spun into fibers using the same conditions as in Example II to produce glass clear fibers of irregular cross sections.

Example V

A spinning solution is made by dispersing 5 parts of a commercial soybean protein preparation in a solution of 5 parts of sodium dioctylsulfosuccinate in 62.5 parts of water. After tumbling the dispersion for 4½ hours, the resultant solution is filtered and centrifuged in a manner similar to Example II. This procedure gives a very viscous paste-like solution of pH 5.6 which is spun to give a white fiber with a smooth surface. Upon heating this solution to 60° C. it becomes clear and much more fluid.

Example VI

A colloidal solution of casein suitable for spinning is made by adding 15 parts of a commercial sulfuric acid casein to a solution of 15 parts of sodium oleate dissolved in 157.5 parts of water. After being tumbled for 4½ hours the resultant solution is filtered and centrifuged to remove air bubbles. At this point it has a pH of 8.52. This solution is spun into the coagulating bath employed in Example II. The fibers are rinsed and hardened as in the above examples. They are clear and lustrous.

The exceptional stability of the surface-active agent protein compositions may be illustrated by the data on this composition which is as follows:

| Solution age in hours | Viscosity in seconds |
|---|---|
| 5 | 234 |
| 22 | 166 |
| 27 | 173 |
| 120 | 138 |

These viscosity measurements are made by measuring the time required for efflux of a standard amount of solution from the same pipette. The concentrated alkaline spinning solutions of the prior art of similar initial viscosity usually become much more viscous and may even gel on aging 20–50 hours.

Example VII

A mixture of casein and zein is spun from solution in a surface-active agent composition. Six parts of a commercial zein protein preparation and 10 parts of a commercial sulfuric acid casein are dispersed in a solution of 8 parts of technical sodium dodecyl sulfate in 72 parts of water. A clear solution of pH 6.08 is obtained upon tumbling this mixture 2 hours. The solution is then spun into a coagulating bath comprising 14.3% sodium sulfate, 3.3% aluminum sulfate, 15% sulfuric acid and the remainder water. The fibers are rinsed and then hardened in a bath containing 7.6% sodium chloride, 3.9% aluminum sulfate, 3.3% formaldehyde and the balance water. The resulting fibers have an irregular cross section.

No exact limits can be placed on ratios of surface-active agents to protein. In general the viscosity limits the spinnable compositions to those containing between 6% and 25% protein. However, it is preferable to employ between 8% and 17% protein. The surface-active agent, in ordinary cases, amounts to 15–100% and preferably 30–60% of the weight of the protein to obtain good spinnable solutions. The solubility of the surface-active agent in some cases limits the concentration of the solution. It has been found that proteins are normally solubilized at a slower rate by surface-active agents than by alkaline materials. This rate may be increased by agitation or the use of slightly elevated temperatures. Frequently it will be found more convenient to use the surface-active agent in the form of an aqueous paste or solution in order to expedite the preparation of the spinning composition.

Mixtures of the surface-active agents may be employed as well as individual compounds. Furthermore, adjuvants may be added to the spinning solution for the purpose of preventing bacterial decomposition, foaming, or extreme changes in pH.

The coagulating bath determines the properties of the fibers to a large extent and must be adjusted to the particular composition being spun to obtain optimum properties. Acidic coagulating baths containing a high percentage of inorganic salts have proven suitable for use. It is particularly advantageous to use a coagulating bath temperature of approximately 25°–60° C. since under these conditions it is possible to impart a high degree of stretch to the fibers being coagulated and thereby obtain fibers stronger than those subjected to lower stretch ratios. The stretching of the fibers has been found to aid in increasing both the wet and dry tenacities. This stretching may be carried out either in the coagulating bath or as an after treatment. The spinning solutions of this invention yield fibers particularly susceptible to stretching.

While temperatures as low as 20° C. may be maintained in the coagulating bath, there is a tendency for the salts in the bath to separate out and form encrustations at these low temperatures. The upper temperature limit is determined jointly by the spinning composition and the salt content of the bath. Thus for higher salt contents a somewhat higher bath temperature may be employed.

The products of this invention are useful as textile fibers. They may be used alone or blended with rayon, cellulose acetate, nylon, wool or cotton materials to produce a more attractive product from the standpoint of either cost or physical attractiveness. It is preferred to admix the protein fibers of this invention with one-half to four times their weight of these base fibers.

As many apparently widely different embodiments of this invention may be made without departing from the spirit and scope thereof, it is to be understood that this invention is not limited to the specific embodiments thereof except as defined in the appended claim.

I claim:

A spinning solution having a pH of about 5.8 and free from alkali solubilized protein, said spinning solution consisting essentially of a solution in about 76 parts of water of 16 parts of sulfuric acid casein and 8 parts of long chain surface active agent which consists of sodium dodecyl sulfate and which is the only solubilizing agent for the casein in said solution.

FREDERICK K. WATSON.

Certificate of Correction

Patent No. 2,403,251. July 2, 1946.

FREDERICK K. WATSON

It is hereby certified that error appears in the printed specification of the above numbered patent requiring correction as follows: Column 1, line 3, for "water-soluble" read *water-insoluble*; and that the said Letters Patent should be read with this correction therein that the same may conform to the record of the case in the Patent Office.

Signed and sealed this 10th day of September, A. D. 1946.

[SEAL]

LESLIE FRAZER,
*First Assistant Commissioner of Patents.*

The products of this invention are useful as textile fibers. They may be used alone or blended with rayon, cellulose acetate, nylon, wool or cotton materials to produce a more attractive product from the standpoint of either cost or physical attractiveness. It is preferred to admix the protein fibers of this invention with one-half to four times their weight of these base fibers.

As many apparently widely different embodiments of this invention may be made without departing from the spirit and scope thereof, it is to be understood that this invention is not limited to the specific embodiments thereof except as defined in the appended claim.

I claim:

A spinning solution having a pH of about 5.8 and free from alkali solubilized protein, said spinning solution consisting essentially of a solution in about 76 parts of water of 16 parts of sulfuric acid casein and 8 parts of long chain surface active agent which consists of sodium dodecyl sulfate and which is the only solubilizing agent for the casein in said solution.

FREDERICK K. WATSON.

Certificate of Correction

Patent No. 2,403,251. July 2, 1946.

FREDERICK K. WATSON

It is hereby certified that error appears in the printed specification of the above numbered patent requiring correction as follows: Column 1, line 3, for "water-soluble" read *water-insoluble*; and that the said Letters Patent should be read with this correction therein that the same may conform to the record of the case in the Patent Office.

Signed and sealed this 10th day of September, A. D. 1946.

[SEAL]

LESLIE FRAZER,
*First Assistant Commissioner of Patents.*